Sept. 22, 1931.  C. C. FARMER  1,824,044
FLUID PRESSURE BRAKE
Filed April 2, 1929
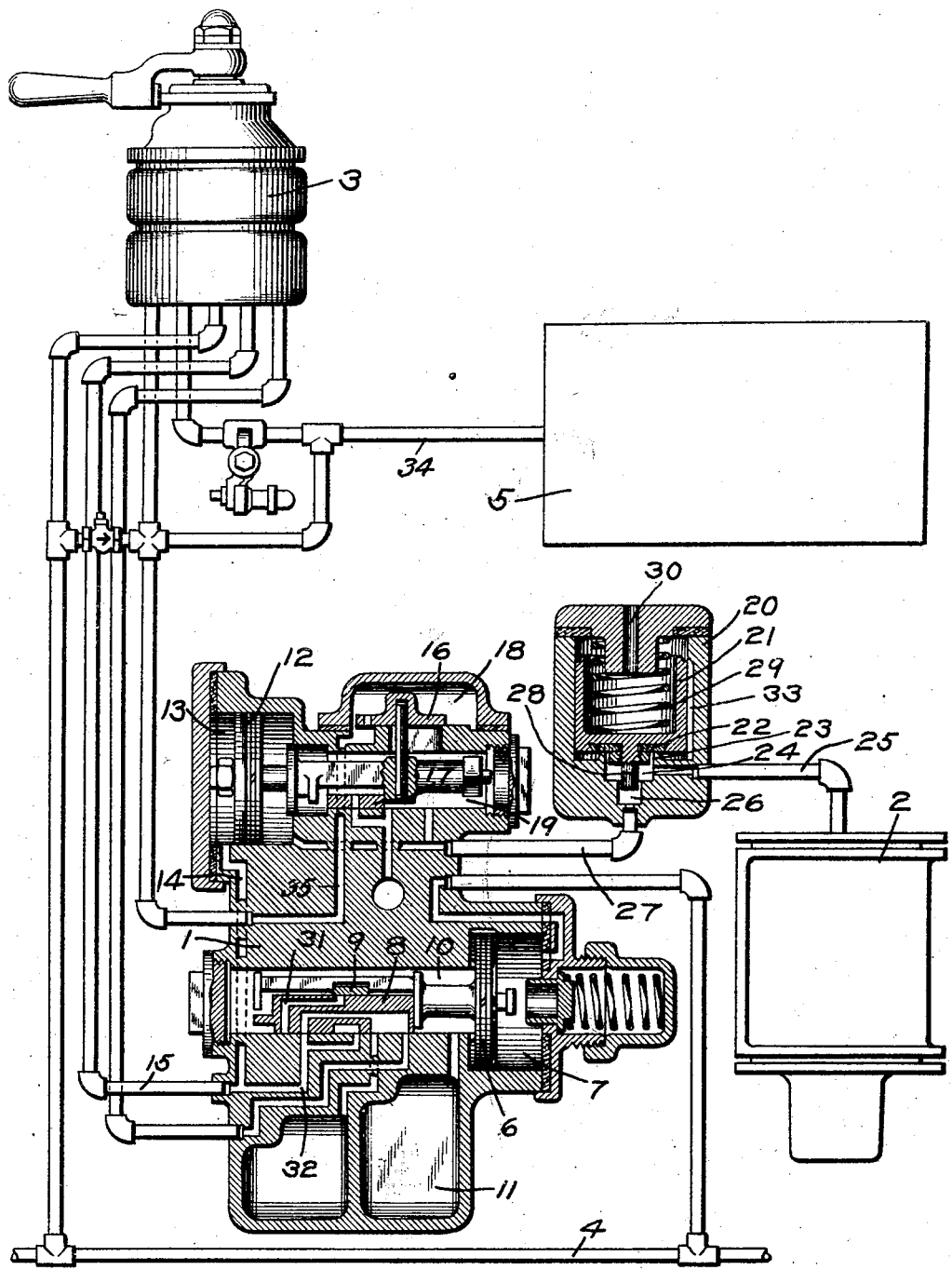
INVENTOR
CLYDE C. FARMER
BY
Wm. M. Cody
ATTORNEY Patented Sept. 22, 1931

1,824,044

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed April 2, 1929. Serial No. 351,838.

This invention relates to fluid pressure brake, and more particularly to the fluid pressure brake equipment employed on the locomotive.

With a train having the cars equipped with what are known as "universal valve devices" and the locomotive equipped with the well known "ET" locomotive brake equipment, the apparatus functions in such a way that in effecting an emergency application of the brakes, the brake cylinder pressure rapidly builds up on the locomotive before it is built up on cars of the train, which cause the slack to run in. Later on, since the universal valve device functions to provide a much higher braking ratio in emergency than is obtained on the locomotive, the slack then runs out and thus is liable to cause very violent shocks between the locomotive and the cars of the train, such as to sometimes damage the draw bar or other parts of the apparatus.

The principal object of my invention is to provide a fluid pressure brake equipment of the above character in which means are provided for delaying the build up of brake cylinder pressure on the locomotive in an emergency application of the brakes sufficiently to prevent the slack from running in.

For this purpose, means are provided for restricting the rate of flow of fluid under pressure to the brake cylinder on the locomotive in an emergency application of the brakes, until the brake cylinder pressure has been increased to a predetermined degree, at which time an unrestricted flow of fluid to the brake cylinder is permitted.

In the accompanying drawing, the single figure is a diagrammatic view, partly in section, of so much of a locomotive fluid pressure brake equipment as is necessary to a clear understanding of my invention, and showing my invention embodied therein.

As shown in the drawing, the equipment comprises a distributing valve device 1, a brake cylinder 2, a brake valve device 3, a brake pipe 4, and a main reservoir 5.

The distributing valve device 1 is of the type employed in the well known "ET" locomotive brake equipment and comprises a casing containing an equalizing portion and an application portion. The equalizing portion comprises an equalizing piston 6, contained in piston chamber 7, which is connected to the brake pipe 4, and a main slide valve 8 and a graduating slide valve 9, adapted to be operated by the piston 6 and contained in a valve chamber 10 which is connected to a pressure reservoir 11.

The application portion comprises a piston 12, contained in application cylinder 13 which is connected to passage 14 and the application cylinder pipe 15, and a supply valve 16 and a release valve 17, contained in the respective valve chambers 18 and 19, and adapted to be operated by piston 12, the valve chamber 18 being charged with fluid under pressure from the main reservoir by way of pipe 34 and passage 35.

According to my invention, a valve device for restricting the flow of fluid to the brake cylinder is provided, comprising a casing 20 containing a valve piston 21 having a valve seat 22 adapted to engage an annular seat rib 23. The chamber 24 at the area of the valve piston within the seat rib 23 is connected by pipe 25 to the brake cylinder 2 and opening into said chamber is a bore 26 of reduced diameter, which is connected to the brake cylinder supply pipe 27, which leads to the valve chamber 19.

Extending into the bore 26, when the valve piston is seated is a stem 28, which is carried by the valve piston, said stem being movable with the valve piston so as to free the bore 26 of the restricting effect of the stem. The valve piston 21 is subject to the pressure of a spring 29, which tends to seat the valve piston and the spring side of the valve piston is open to the atmosphere by way of passage 30.

A detailed description of the operation of the locomotive brake equipment is not deemed necessary and it is sufficient to understand that upon movement of the brake valve device 3 to service application position, a reduction in brake pipe pressure is effected in the usual manner, and the equalizing piston 6 is thereby moved out, so that the service port 31 is in registry with passage 32. Fluid under pressure is then supplied from the pressure chamber 11 and the valve chamber 10 to passage 14 and the application cylinder 13.

Piston 12 is then shifted to the right, so that the valve 16 opens communication through which fluid under pressure is supplied from valve chamber 18 and the main reservoir 5 to chamber 19 and the brake cylinder pipe 27, and flow to the brake cylinder is effected in service around the stem 28 to pipe 25 and the brake cylinder 2. In service, the rise in pressure is not sufficient to lift the valve piston 21, and the restricted flow area around the stem 28 is sufficient to provide the desired maximum service rate of flow.

When the brake valve device 3 is operated to effect an emergency application of the brakes, the brake pipe pressure is suddenly reduced, causing the piston 6 to move to the extreme right hand position, in which slide valve 8 uncovers passage 32, so that a rapid flow of fluid under pressure from the pressure chamber 11 to the application cylinder 13 is effected.

At the same time, fluid at main reservoir pressure is supplied by the brake valve device in the usual manner, to pipe 15 and the application cylinder 13. The application piston 12 is then shifted to the right and fluid under pressure is supplied to the brake cylinder as in a service application. Initially, fluid under pressure flows to the brake cylinder through the restricted area formed by the stem 28 extending into the bore 26, so that the build up of brake cylinder pressure is at a relatively slow predetermined rate, the same as in a service application, so that the brakes on the locomotive will not be applied with such force as to cause the slack to run in.

During this period, the brakes are being applied on the cars of the train, but even though the brakes are applied with high pressure on the cars, as is the case where universal valve devices are employed, violent shocks will not occur, since the brakes on the locomotive were not permitted to apply with such force as to cause the slack to run in.

When the brake cylinder pressure on the locomotive has been built up to a predetermined degree, the pressure of spring 29 will be overcome, and the valve piston 21 will be lifted from its seat, so that the stem 28 is moved out of its restricting position in the bore 26, and thereafter a full or substantially unrestricted flow of fluid to the brake cylinder is permitted.

When the valve piston 21 moves to its upper seat, escape of fluid under pressure through the passage 30 is prevented by the seating of the valve piston. A leakage groove 33 around the valve piston 21 may be provided, so that with the valve piston seated on its lower seat, possible leakage of fluid past the seat will escape through the groove 33 and the exhaust passage 30, thus preventing a build up of fluid pressure on the lower face of the valve piston.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a locomotive fluid pressure brake equipment, the combination with a brake cylinder, of means for effecting an emergency application of the brakes and means only on the locomotive for initially supplying fluid under pressure at a restricted rate to the brake cylinder in an emergency application of the brakes.

2. In a locomotive fluid pressure brake equipment, the combination with a brake cylinder, of means for effecting an emergency application of the brakes and means on the locomotive only for supplying fluid under pressure at the restricted rate to the brake cylinder in effecting an emergency application of the brakes and operated upon a predetermined increase in brake cylinder pressure for permitting a more rapid rate of flow to the brake cylinder.

3. In a locomotive fluid pressure brake equipment, the combination with a brake cylinder, of means for effecting an emergency application of the brakes, and a valve device having means for restricting communication through which fluid under pressure flows to the brake cylinder, said valve device being operated upon a predetermined increase in the pressure of fluid supplied to the brake cylinder to actuate said means so as to eliminate the restriction of said communication.

4. In a locomotive fluid pressure brake equipment, the combination with a brake cylinder, a brake pipe, and a distributing valve device operated upon a reduction in brake pipe pressure for supplying fluid under pressure to the brake cylinder, of a member normally providing a restricted communication through which fluid is supplied to the brake cylinder at a slow rate, and a piston subject to the pressure of fluid supplied to the brake cylinder for operating said member, said piston being operated upon a predetermined increase in the pressure of fluid supplied to the brake cylinder for shifting said member out of its restricting position.

5. In a locomotive fluid pressure brake equipment, the combination with a brake cylinder, and a valve device for controlling the supply of fluid under pressure to the brake cylinder to effect an application of the brakes, of a member for restricting communication through which fluid under pressure is supplied to the brake cylinder and movable out of its restricting position to provide a substantially unrestricted communication, a spring, and a piston subject to the opposing pressure of the brake cylinder and said spring for operating said member.

In testimony whereof I have hereunto set my hand this 19th day of March, 1929.

CLYDE C. FARMER.